(12) United States Patent
Lu et al.

(10) Patent No.: US 7,944,089 B2
(45) Date of Patent: May 17, 2011

(54) UNINTERRUPTIBLE POWER SUPPLY MODULE

(75) Inventors: Yan-Song Lu, Shanghai (CN); Fei Lv, Shanghai (CN); Jing-Tao Tan, Shanghai (CN); Jian-Ping Ying, Shanghai (CN)

(73) Assignee: Delta Electronics, Inc., Hsien (TW)

( * ) Notice: Subject to any disclaimer, the term of this patent is extended or adjusted under 35 U.S.C. 154(b) by 141 days.

(21) Appl. No.: 12/355,243

(22) Filed: Jan. 16, 2009

(65) Prior Publication Data

US 2009/0184583 A1      Jul. 23, 2009

(30) Foreign Application Priority Data

Jan. 23, 2008  (TW) ............................... 97102465 A
Apr. 9, 2008   (TW) ............................... 97112841 A

(51) Int. Cl.
*H02J 1/00* (2006.01)
(52) U.S. Cl. ....................................................... 307/66
(58) Field of Classification Search ...................... 307/66
See application file for complete search history.

(56) References Cited

U.S. PATENT DOCUMENTS

| | | | |
|---|---|---|---|
| 6,104,104 A * | 8/2000 | Kuroki | ............................. 307/66 |
| 6,483,730 B2 * | 11/2002 | Johnson, Jr. | .................. 363/123 |
| 2008/0012486 A1 | 1/2008 | Horie | |

OTHER PUBLICATIONS

Office Action, dated Apr. 14, 2010, received in Chinese Patent Application No. 200810095214.6, 7 pgs.
Reference Translation of the Office Action, dated Apr. 14, 2010, received in Chinese Patent Application No. 200810095214.6, 9 pgs.

* cited by examiner

*Primary Examiner* — Robert L. Deberadinis
(74) *Attorney, Agent, or Firm* — Holland & Knight LLP; Brian J Colandreo, Esq.; Jeffrey T Placker

(57) ABSTRACT

An uninterruptible power supply module is provided. The uninterruptible power supply module comprises an input terminal, a direct-current voltage source, a control module, a control arm-bridge module, an inductive element, a power source selection switch, and a switch element. The switch element is turned on before the power source selection switch is connected to the inductive element so that the direct-current voltage supplied by the direct-current voltage source is modulated by the control arm-bridge module to generate an output alternating current voltage to the load. And the switch element is turned off, i.e. not conducting electricity, after the power source selection switch is connected to the inductive element and the direct-current voltage source. Thereby, the use life of the power source selection switch element and the reliability of the uninterruptible power supply module are both increased.

18 Claims, 6 Drawing Sheets

UNINTERRUPTIBLE POWER SUPPLY MODULE

CROSS-REFERENCE TO RELATED APPLICATION(S)

This application claims priority to Taiwan Patent Application Nos. 0970102465 filed on 23 Jan. 2008 and Taiwan Patent Application No. 097112841 filed on 9 Apr. 2008.

BACKGROUND OF THE INVENTION

1. Field of the Invention

The present invention relates to an uninterruptible power supply module. More specifically, the present invention relates to an uninterruptible power supply module having an auxiliary switch element.

2. Descriptions of the Related Art

With advancement of power supply technologies, uninterruptible power supply modules have emerged as an indispensable part of a power supply system. An uninterruptible power supply module operates in the following way. When alternating-current (AC) voltage source operates normally, the uninterruptible power supply module receives power from AC voltage source, and regulates the AC voltage to a regulated AC output voltage to load. On the other hand, in case AC power source failure or an abnormal voltage exceeding a predetermined value occurs, the uninterruptible power supply module will operate to switch the circuit to a direct-current (DC) voltage source (e.g., a battery) by a power source selection switch (e.g. a relay), so that a DC voltage supplied by the DC voltage source is modulated by the UPS, and the UPS supplies an AC voltage to power the load. By means of the power supply switching, a continuous power supply is maintained for the load. Unfortunately, conventional uninterruptible power supply modules are usually both oversized and overweight.

To solve these problems, U.S. Pat. No. 6,104,104 discloses an uninterruptible power supply module adopting a new control method, in which an electrolytic capacitor conventionally used for an uninterruptible power supply module is replaced by a small capacitor. This results in significant reduction in both volume and weight of the capacitor and enhances reliability of the uninterruptible power supply module as a whole.

However, the power source selection switch in such an uninterruptible power supply module is a mechanical switch with a relatively long switch time (millisecond level). Before completion of the switching from the primary AC power source to the battery, the small capacitor described in U.S. Pat. No. 6,104,104 is unable to supply adequate energy to the load during the switch process. Consequently, a temporary interruption inevitably exists in the output voltage during the switch process, which greatly endangers reliable operation of the load. Moreover, when the mechanical switch operating, a large current may cause failure of the switch process, or even cause arcing between associated contacts and consequent burnout of the mechanical switch.

In view of this, efforts still have to be made in the art to provide an uninterruptible power supply module that can ensure a safe and reliable switch process, thereby to continuously supply a constant current to a load.

SUMMARY OF THE INVENTION

One objective of the present invention is to provide an uninterruptible power supply module, which is coupled to an alternating-current (AC) voltage source to receive an input AC voltage provided by the AC voltage source, and is configured to provide an output AC voltage to a load. The uninterruptible power supply module comprises a direct-current (DC) voltage source, a control module, a control arm-bridge module, an inductive element, a power source selection switch and a switch element. The DC voltage source is configured to provide a DC voltage. The control module, which is coupled to the AC voltage source, is configured to detect a voltage value of the input AC voltage and to generate a control signal in response to the voltage value. The inductive element, which is coupled to the AC voltage source and the DC voltage source, is configured to receive one of the DC voltage and the input AC voltage. The control arm-bridge module, which is coupled to the inductive element and the load, is configured to modulate one of the DC voltage and the input AC voltage as the output AC voltage to be transmitted to the load. The power source selection switch, which is coupled to the inductive element, comprises an AC input terminal and a DC input terminal, in which the AC input terminal is coupled to the AC voltage source and the DC input terminal is coupled to the DC voltage source. The power source selection switch enables the inductive element to connect to one of the AC input terminal and the DC input terminal in response to the control signal, so that the connected voltage is modulated by the control arm-bridge module as the output AC voltage to be provided to the load. The switch element, which is coupled to the DC voltage source and the control arm-bridge module, make the power source selection switch turning on in zero voltage condition or turning off in zero current condition in the direct-current input terminal. The switch element, which is coupled to the DC voltage source and the control arm-bridge module, is turned on in response to the control signal before the power source selection switch enables the inductive element to connect to the DC input terminal, so that the DC voltage is modulated by the control arm-bridge module as the output AC voltage to be provided to the load; and the switch element is turned off after the power source selection switch has enabled the inductive element to connect to the DC input terminal.

Additionally, the switch element is further configured to be turned on in response to the control signal before the power source selection switch enables the inductive element to connect to the AC input terminal, so that the DC voltage is modulated by the control arm-bridge module as the output AC voltage to be provided to the load; and the switch element is turned off after the power source selection switch has enabled the inductive element to connect to the AC input terminal.

By the use of a switch element, the present invention is capable of obviating the current bounce when a power source selection switch of an uninterruptible power supply module switches between an AC terminal and a DC terminal, and continuously supplies a high-quality power to a load by using a control arm-bridge module to generate an output AC voltage. Furthermore, the present invention provides an optimized switching status of the power source selection switch.

The switch process between the AC input terminal and the DC input terminal is actually a turn-on process involving a zero current state, a current stress imposed on the power source selection switch is optimized. As a result, the service life of the power source selection switch is prolonged and reliability of the uninterruptible power supply module is enhanced. Furthermore, as the control arm-bridge module comprises a capacitor, the uninterruptible power supply module of the present invention may further maintain a constant voltage across the capacitor, thus eliminating the disadvantages of: not supplying the load with adequate energy, the temporary interruption inevitably existing in the output voltage during the switch process, and causing arcing between associated contacts and consequent burnout of the power source selection switch in the conventional uninterruptible power supply modules.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
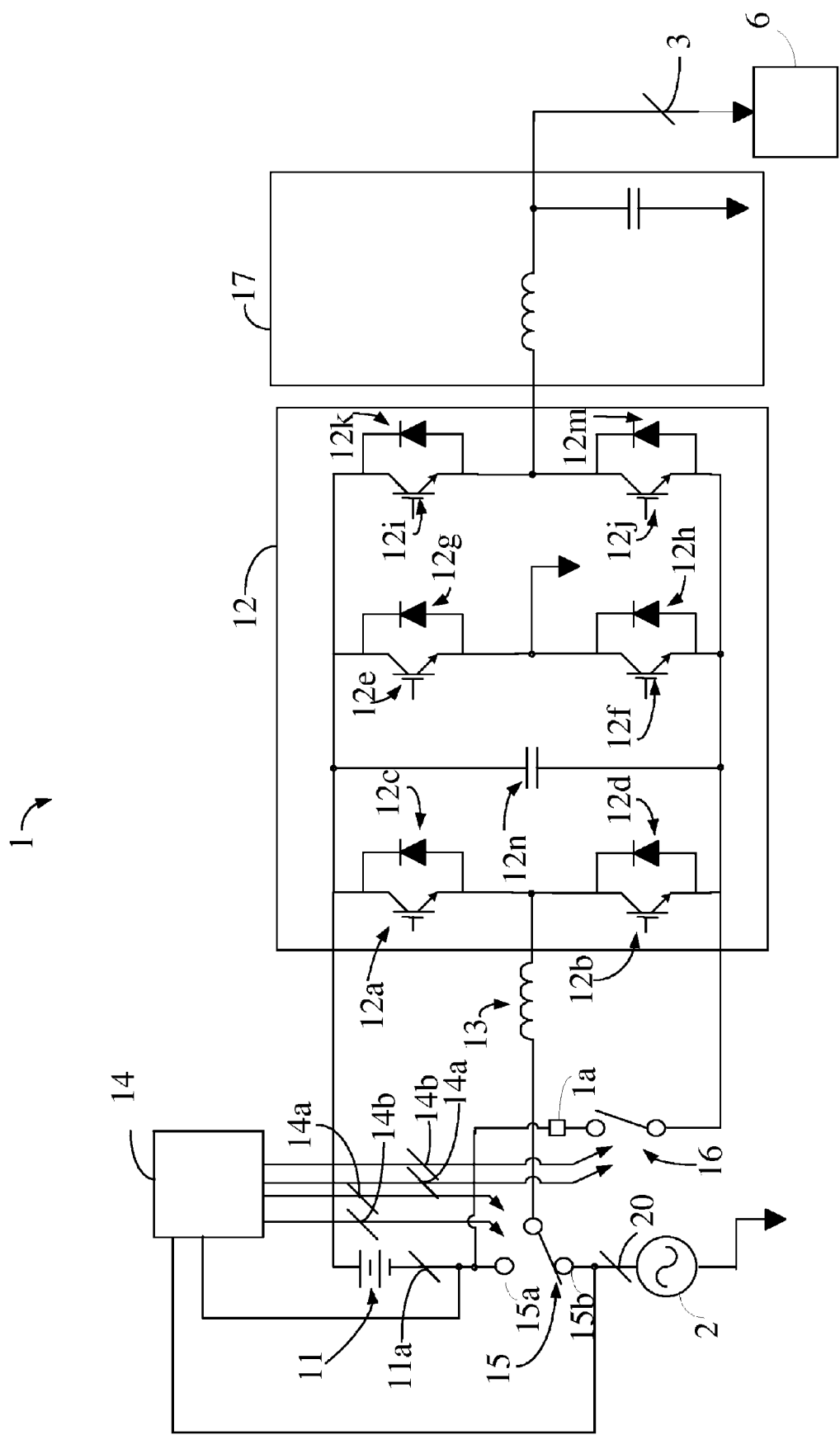
FIG. 1 is a schematic view of a preferred embodiment of the present invention.

The present invention will now be explained with reference to embodiments thereof. FIG. 1 illustrates a preferred embodiment of the present invention, which is an uninterruptible power supply module 1 coupled to an AC voltage source 2. The uninterruptible power supply module mode 1 is adapted to receive an input AC voltage 20 supplied by the AC voltage source 2, and to supply an output AC voltage 3 to a load 6. The uninterruptible power supply module 1 comprises a DC voltage source 11, a control arm-bridge module 12, an inductive element 13, a control module 14, a power source selection switch 15 including a DC input terminal 15a and an AC input terminal 15b, a switch element 16 and an output filtering module 17. The output filtering module 17 can be implemented by conventional technologies irrelevant to the innovative concepts of the present invention, and thus will not be further described herein.

For ease of description, a power supply mode where the power source selection switch 15 of the uninterruptible power supply module 1 is switched to the AC input terminal 15b is called an "AC mode", while a power supply mode where the power source selection switch 15 of the uninterruptible power supply module 1 is switched to the DC input terminal 15a is called a "DC mode". The AC voltage 20 is supplied by an AC voltage source 2. The AC input terminal 15b is coupled to the AC voltage source 2 to receive the input AC voltage 20. The DC voltage 11a is supplied by a DC voltage source 11. The DC input terminal 15a is coupled to the DC voltage source 11 to receive the DC voltage 11a. In this embodiment, the DC voltage source 11 is an energy storage device such as a battery. The control arm-bridge module 12, which is coupled to the inductive element 13 and the load 6, is configured to convert one of the DC voltage 11a and the input AC voltage 20 into the output AC voltage 3 supplied to the load 6. The inductive element 13, which is coupled to the AC voltage source 2 and the DC voltage source 11, is configured to receive one of the DC voltage ha and the input AC voltage 20. The control module 14, which is coupled to the AC voltage source 2, is configured to detect a voltage value of the input AC voltage 20 and to generate a control signal 14a in response to the voltage value. In this case, the control signal 14a represents an abnormal status where a power failure or a voltage exceeding a predetermined voltage value occurs. In this embodiment, the control module 14 mainly functions to control the power source selection switch 15 and the switch element 16 and to detect a voltage value of the input AC voltage 20. The control module 14 may be a micro control unit, although it may also be replaced by any other circuits having the same functions in other embodiments and does not limit this present invention.

The power source selection switch 15, which is coupled to the inductive element 13, enables the inductive element 13 to connect to the DC input terminal 15a in response to the control signal 14a, so that the DC voltage 11a is modulated by the control arm-bridge module 12 as the output AC voltage 3 supplied to the load 6. In other words, in case an abnormal status occurs in the AC mode, the power source selection switch 15 will be switched to the DC mode. During the transition of AC and DC mode, electric power from the DC voltage source 11 is transmitted via the switch element 16 to the control arm-bridge module 12 to maintain continuous power supply to the load 6.

The switch element 16, which is coupled to the DC voltage source 11 and the control arm-bridge module 12, is turned on in response to the control signal 14a before the power source selection switch 15 enables the inductive element 13 to connect to the DC input terminal 15a, so that the DC voltage ha is modulated by the control arm-bridge module 12 as the output AC voltage 3 supplied to the load 6. After the power source selection switch 15 has enabled the inductive element 13 to connect to the DC input terminal 15a, the switch element 16 is turned off. In this preferred embodiment, the power source selection switch 15 is a mechanical switch, and the switch element 16 is an electronic switch element such as a silicon-controlled rectifier, a metal-oxide semiconductor field-effect transistor (MOSFET), an insulated gate bipolar transistor, and so on. The uninterruptible power supply module 1 further comprises a current limiting element 1a through which the DC voltage source 11 is coupled to the switch element 16. The current limiting element 1a is configured to limit a current magnitude of DC voltage ha flowing through the switch element 16, thereby to prevent the current bounce when the input AC voltage 20 and the DC voltage 11a are switching.

Moreover, the control module 14 is further configured to detect a voltage value of the input AC voltage 20 and generates a control signal 14b in response to the detected voltage value. In this case, the control signal 14b represents that the input AC voltage 20 is in a normal status. However, the power source selection switch 15 has now been switched to the DC input terminal 15a to receive the DC voltage 11a as an input power supply of the control arm-bridge module 12. In response to the control signal 14b representing that the input AC voltage 20 is at a normal voltage, the power source selection switch 15 further enables the inductive element 13 to connect to the AC input terminal 15b, so that the input AC voltage 20 transmitted through the inductive element 13 is modulated by the control arm-bridge module 12 as the output AC voltage 3 supplied to the load 6. The switch element 16 is further configured to be turned on in response to the control signal 14b before the power source selection switch 15 enables the inductive element 13 to connect to the AC input terminal 15b, so that the DC voltage 11a is converted into the output AC voltage 3 supplied to the load 6. The switch element 16 is turned off after the power source selection switch 15 has enabled the inductive element 13 to connect to the AC input terminal 15b.

More particularly, the control arm-bridge module 12 comprises a plurality of arm-bridges connected in parallel and a capacitor 12n. The output AC voltage 3 is supplied to the load 6 through these arm-bridges. In this embodiment, the control arm-bridge module 12 comprises three arm-bridges, although the number of the arm-bridges in the control arm-bridge module 12 is not intended to limit the present invention. The three arm-bridges are a first arm-bridge, a second arm-bridge and a third arm-bridge respectively. The first arm-bridge comprises a first switch unit 12a, a second switch unit 12b, a first directional element 12c and a second directional element 12d. The second arm-bridge comprises a first switch unit 12e, a second switch unit 12f, a first directional element 12g and a second directional element 12h. The third arm-bridge comprises a first switch unit 12i, a second switch unit 12j, a first directional element 12k and a second directional element 12m. Any of these arm-bridges may be implemented by conventional technologies, for example, by a circuit structure in which a transistor is coupled with a diode. In the following description, the first arm-bridge will be taken as an example to describe relevant details of this embodiment.

As illustrated in FIG. 1, the first switch unit 12a and the second switch unit 12b are connected with each other in series. The first arm-bridge is connected with the capacitor 12n in parallel. The switch element 16 is connected with a terminal of the first arm-bridge in series. At the outset when the input AC voltage 20 has a normal voltage value, the power source selection switch 15 is switched to the AC input terminal 15b to receive the input AC voltage 20, so that the input AC voltage 20 transmitted through the inductive element 13 is modulated by the control arm-bridge 12 as the output AC voltage 3 supplied to the load 6. The switch element 16 keeps on, and the first switch unit 12a and the second switch unit 12b operate in a pulse width modulation (PWM) mode to allow the input AC voltage 20 to pass through the first arm-bridge.

Once detecting an abnormal voltage value of the input AC voltage 20, the control module 14 generates a control signal 14a for switching the power source selection switch 15 from the AC input terminal 15b to the DC input terminal 15a. As the power source selection switch 15 is a mechanical power source selection switch which spends certain time to accomplish the switching operation, the control signal 14a turns on the switch element 16 simultaneously during the switching process performed by the power source selection switch 15, so that the DC voltage 11a supplied by the DC voltage source 11 is transmitted to the control arm-bridge module 12 instantly. The DC voltage 11a is converted into an output AC voltage 3 to continuously power the load 6. Once the switch element 16 is turned on, the first switch unit 12a and the second switch unit 12b are turned off accordingly, so that the DC voltage source 11 is connected in parallel with the capacitor 12n via the switch element 16. Consequently, the output AC voltage 3 is supplied to the load 6 through the capacitor 12n and the second and third arm-bridges of the control arm-bridge modules 12. In this way, a constant voltage is maintained across the capacitor 12n even during the switching process performed by the power source selection switch 15. Additionally, the inductive element 13 is coupled to a juncture between the first switch unit 12a and the second switch unit 12b, so that one of the input AC voltage 20 and the DC voltage 11a (depending on the switching status of the power source selection switch 15) is converted by the control arm-bridge module 12 into the output AC voltage 3 supplied to the load 6. Further, the first directional element 12c (for example a diode) is connected with the first switch unit 12a in parallel, while the second directional element 12d is connected with the second switch unit 12b in parallel, so as to control direction of the current flowing through the first arm-bridge.

Once the power source selection switch 15 is switched to the DC voltage source 11 successfully, the power source selection switch 15 receives the DC voltage 11a and transmits it to the control arm-bridge module 12, which then converts the DC voltage 11a into the output AC voltage 3 supplied to the load 6. Then, the switch element 16 no longer needs to receive the DC voltage 11a and is turned-off. Further, the control module 14 also continuously detects the voltage value of the input AC voltage 20. Once the input AC voltage 20 recovers a normal value, the power source selection switch 15 has to switch from the DC input terminal 15a back to the AC input terminal 15b. The switch process thereof and operations of the switch element 16 are just the same as the case of switching from the AC input terminal 15b to the DC input terminal 15a, and thus will not be described again.

Figure 2:
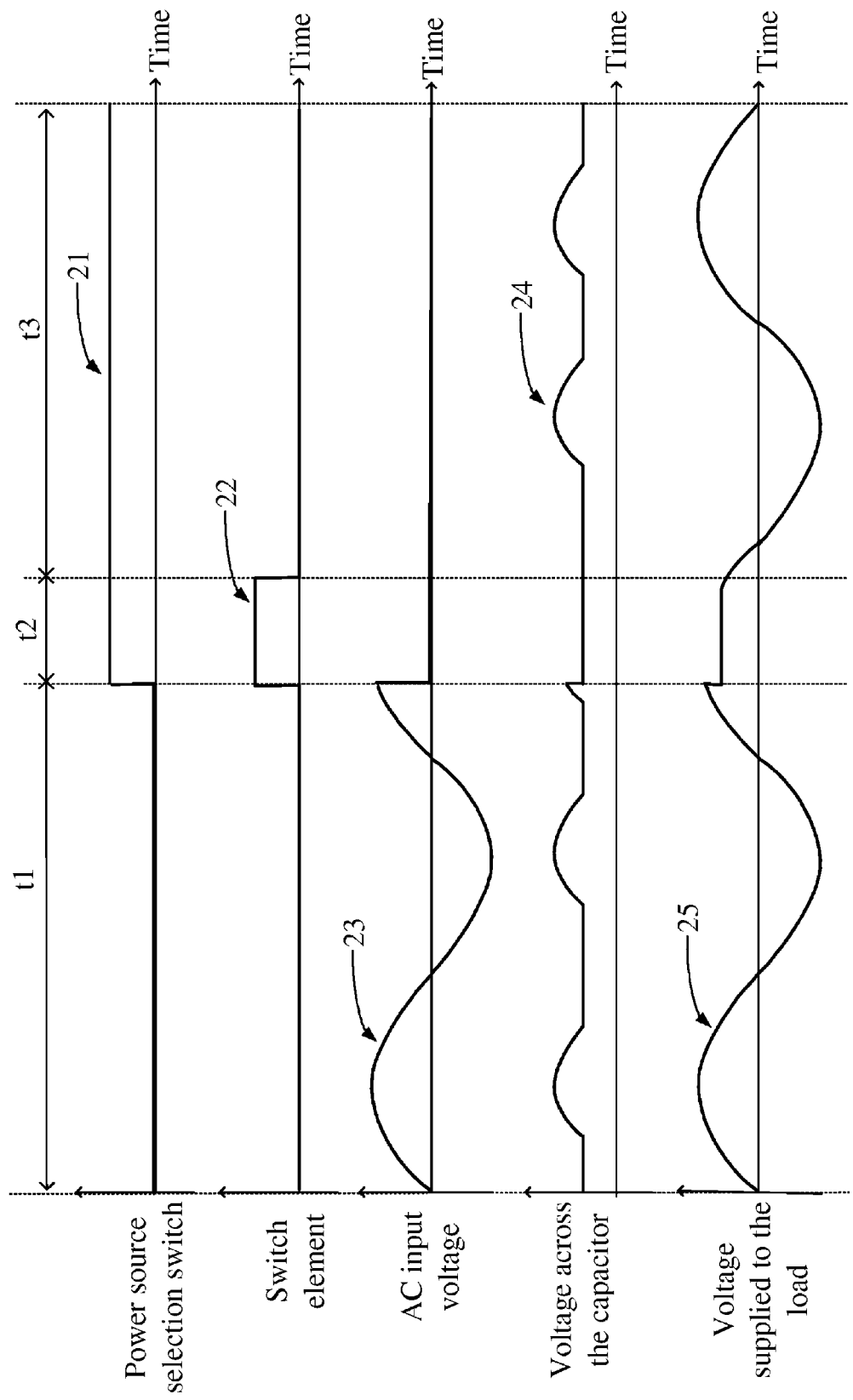
FIG. 2 is an oscillogram during a switch process from an AC mode to a DC mode when a DC voltage source of this preferred embodiment has a low voltage.

To facilitate a better understanding of how the uninterruptible power supply module 1 of this preferred embodiment operates in various statuses, please refer to FIGS. 2 to 5. FIG. 2 illustrates an oscillogram during a switch process from an AC mode to a DC mode when the DC voltage source 11 has a low voltage (i.e., the voltage value of the DC voltage 11a is smaller than a peak value of the output AC voltage 3), where the horizontal axis represents time. This oscillogram includes waveforms 21 to 25, which represent in sequence a control signal of the power source selection switch 15, a control signal of the switch element 16, an input AC voltage, a voltage across the capacitor 12n, and the output AC voltage 3 outputted to the load 6 respectively.

It should be noted that, a logic low level in the waveform 21 (i.e., a control signal of the power source selection switch 15) represents that the power source selection switch 15 has been or is being switched to the AC input terminal 15b, while a logic high level represents that the power source selection switch 15 has been or is being switched to the DC input terminal 15a; a logic low level of the waveform 22 (i.e., a control signal of the switch element 16) represents that the switch element 16 is turned off, while a logic high level represents that the switch element 16 is turned on.

Therefore, during the time period t1, the power source selection switch 15 is switched to the AC input terminal 15b. As the input AC voltage 20 from the AC input terminal 15b has a normal value, it is unnecessary to switch to the DC input terminal 15a, and the waveform 22 stays at a logic low level. During the next time period t2, the control module 14 detects an abnormal value of the AC voltage 20. In response to this situation, the power source selection switch 15 is switched from the AC input terminal 15b to the DC input terminal 15a, so that the DC voltage source 11 is enabled to supply power temporarily to the load 6. At this point, the waveform 21 is transitioned to the logic high level, the waveform 22 is transitioned to the logic high level and the waveform 23 approaches to zero, all of which indicate an abnormal value of the input AC voltage 20. Additionally, it can be seen from variations of the waveforms 24 and 25 that, the DC voltage source 11 has a low voltage. After the time period t2, a time period t3 comes. During the time period t3, the power source selection switch 15 has been switched successfully to the DC input terminal 15a. At this time, the waveform 21 stays at the logic high level, the waveform 22 is transitioned back to the logic low level, and the waveform 23 still approaches to zero, all of which indicate that the input AC voltage 20 has an abnormal value. A variation also occurs in the waveforms 24 and 25 accordingly in response to the low voltage of the DC voltage source 11.

In other words, during the time period t3, the uninterruptible power supply module 1 has been switched successfully from the AC mode to the DC mode. At this point, the switch element 16 is turned off, and the power source selection switch 15 has been connected to the DC voltage source 11 through the DC input terminal 15a and completely separated from the AC input terminal 15b.

Figure 3:
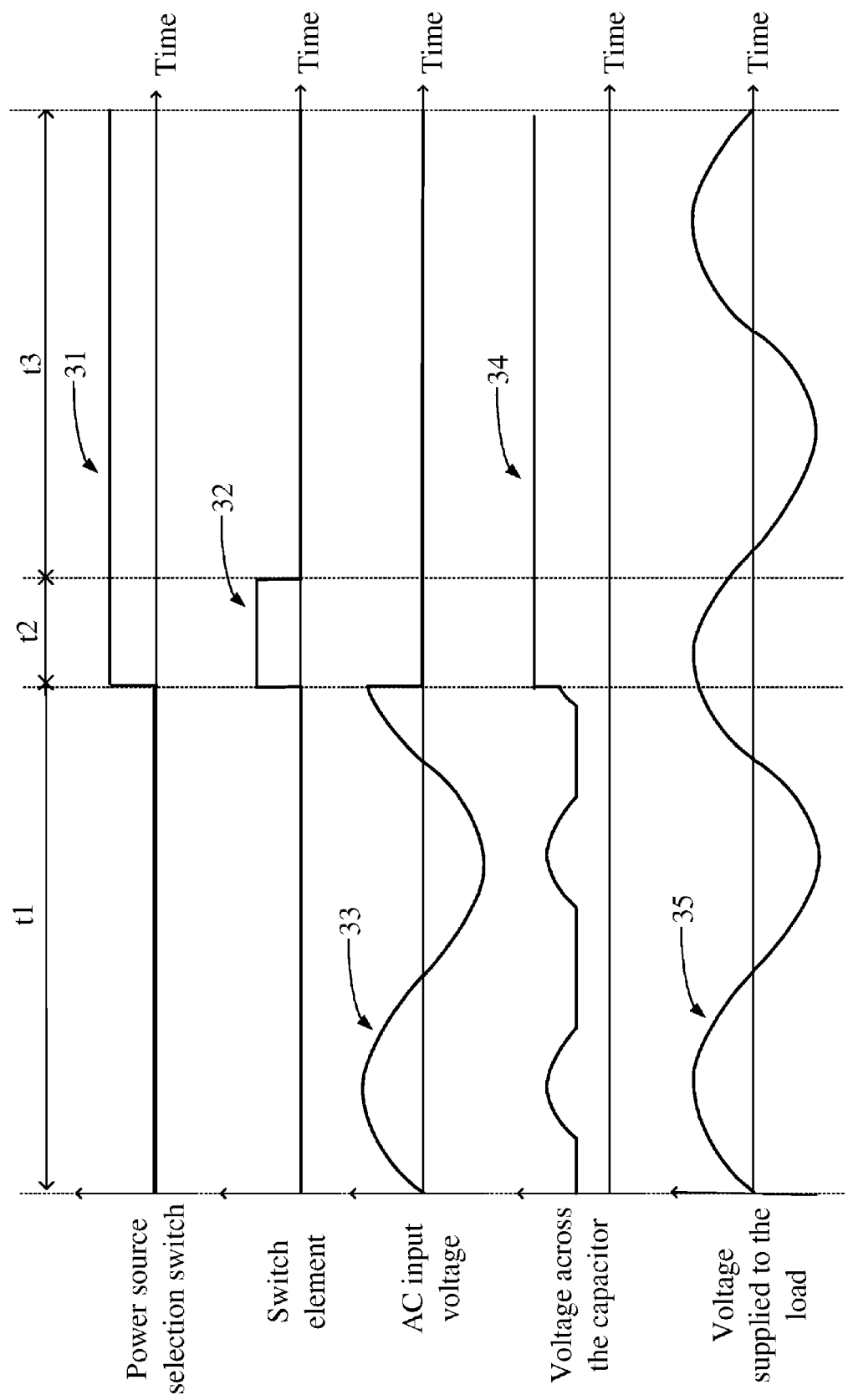
FIG. 3 is an oscillogram during a switch process from an AC mode to a DC mode when the DC voltage source of this preferred embodiment has a high voltage.

Referring to FIG. 3, which is an oscillogram illustrating that during the switch process from the AC mode to the DC mode, the DC voltage source 11 of this preferred embodiment has a high voltage (i.e., a voltage value of the DC voltage 11a is higher than a peak value of the output AC voltage 3), where the horizontal axis represents time. This oscillogram includes waveforms 31 to 35, which represent in sequence a control signal of the power source selection switch 15, a control signal of the switch element 16, the input AC voltage 20, a voltage across the capacitor 12n, and the output AC voltage 3 outputted to the load 6 respectively. Waveforms of FIG. 3 vary in a similar way to those of FIG. 2, except that the DC voltage source 11 has become a high voltage instead, the waveforms 34 and 35 changes accordingly.

Figure 4:
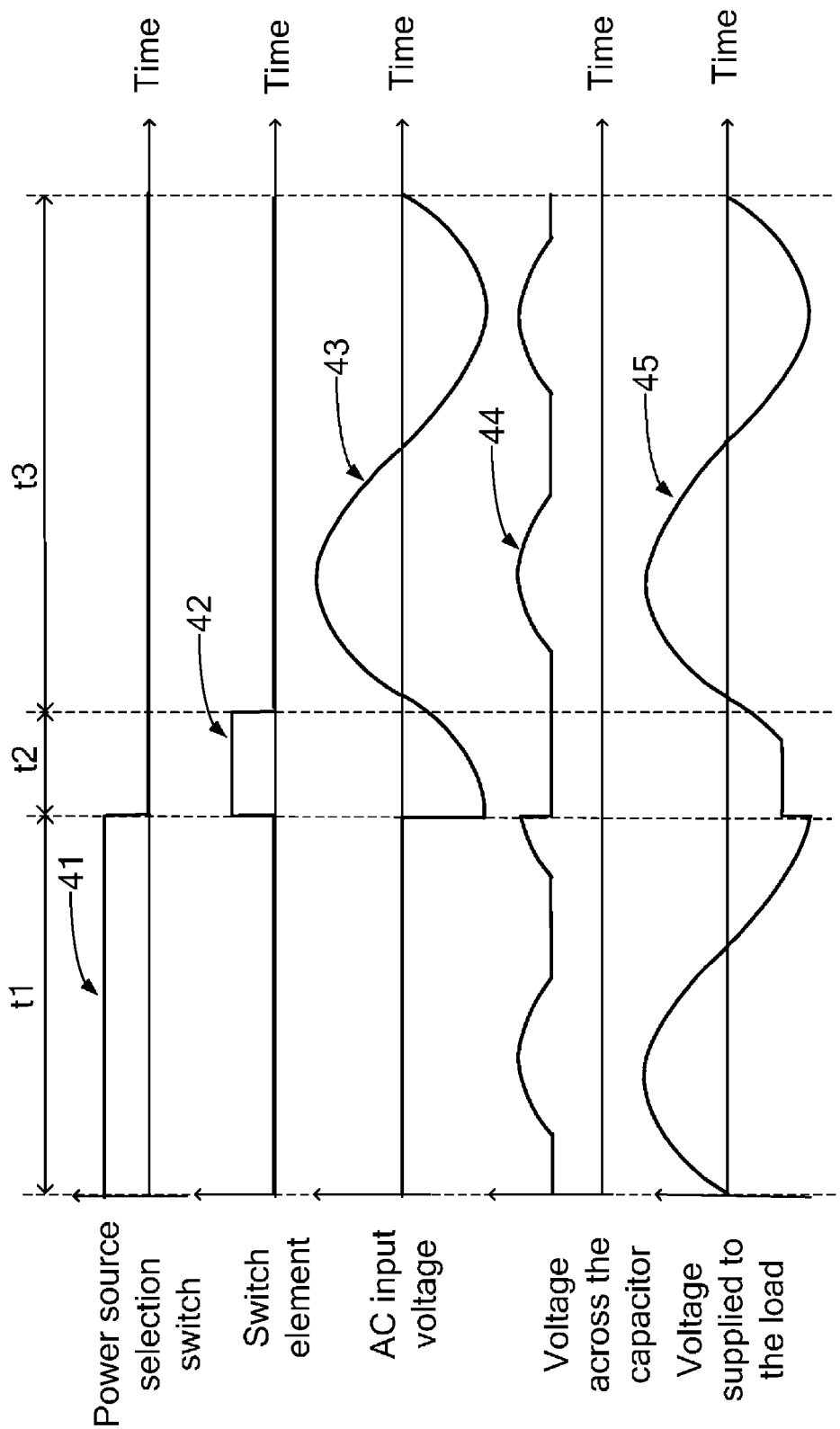
FIG. 4 is an oscillogram during a switch process from a DC mode to an AC mode when the DC voltage source of this preferred embodiment has a low voltage.

Referring to FIG. 4, which is an oscillogram representing that during the switching process from the DC mode to the AC mode when the DC voltage source 11 has a low voltage, where the horizontal axis represents time. This oscillogram includes waveforms 41 to 45, which represent in sequence a control signal of the power source selection switch 15, a control signal of the switch element 16, the input AC voltage 20, a voltage across the capacitor 12n, and the output AC voltage 3 outputted to the load 6 respectively. Variations of the waveforms in FIG. 4 will be understood by those skilled in the art upon reviewing those of FIG. 2, and thus will not be further described herein.

Figure 5:
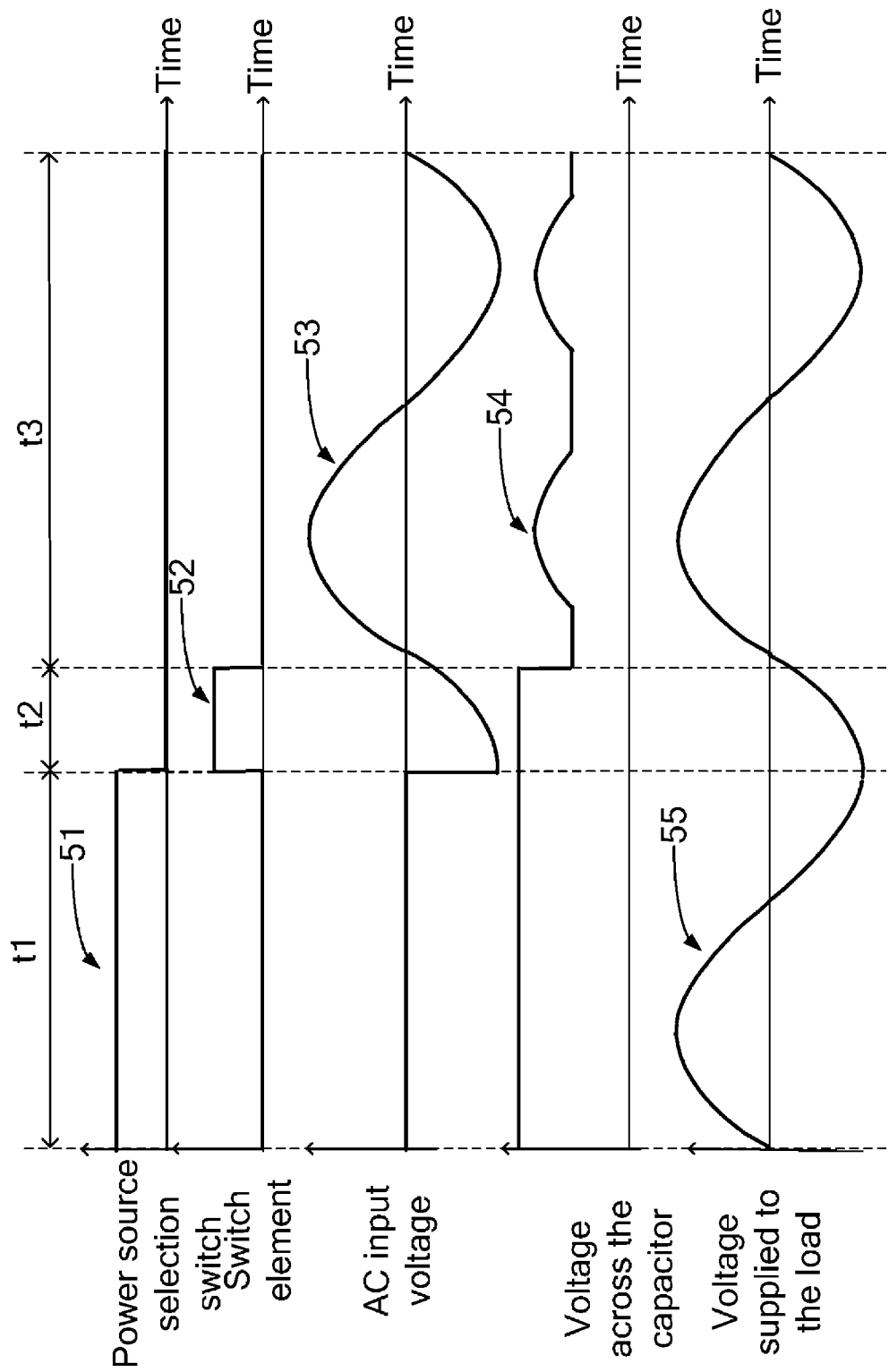
FIG. 5 is an oscillogram during a switch process from a DC mode to an AC mode when the DC voltage source of this preferred embodiment has a high voltage.

Referring to FIG. 5, which is an oscillogram representing that during the switching process from the DC mode to the AC mode when the DC voltage source 11 has a high voltage, where the horizontal axis represents time. This oscillogram includes waveforms 51 to 55, which represent in sequence a control signal of the power source selection switch 15, a control signal of the switch element 16, the input AC voltage 20, a voltage across the capacitor 12n, and the output AC voltage 3 outputted to the load 6 respectively. Variations of the waveforms in FIG. 5 will be understood by those skilled in the art upon reviewing those of FIG. 3, and thus will not be further described herein.

Figure 6:
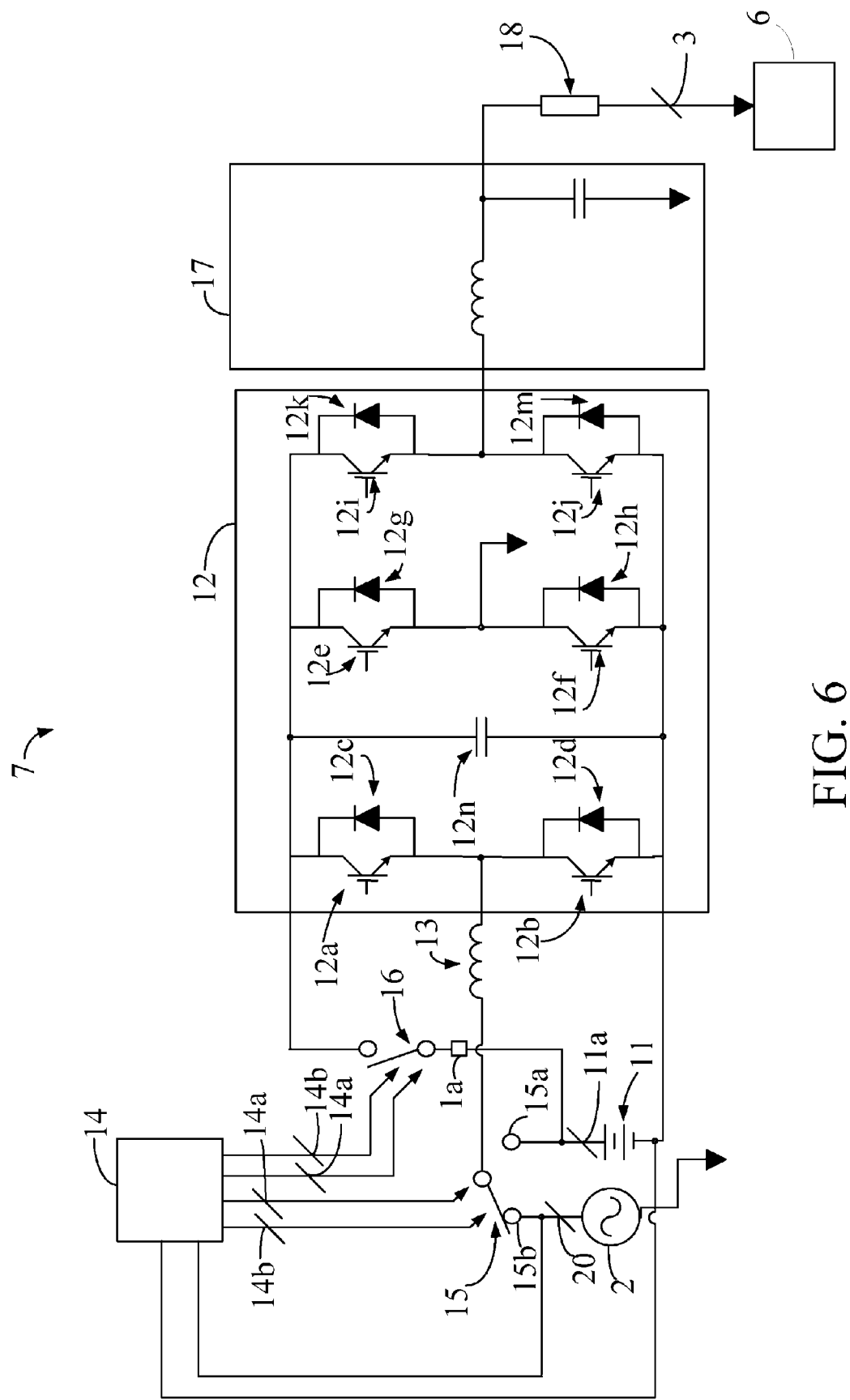
FIG. 6 is a schematic view of another example of this preferred embodiment.

Referring to FIG. 6, a schematic view of another example of the preferred embodiment is illustrated therein. An uninterruptible power supply module 7 illustrated therein differs from the uninterruptible power supply module 1 in that, the DC voltage source 11 of the uninterruptible power supply module 1 has a positive terminal thereof connected to one terminal of the capacitor 12n, and a negative terminal thereof connected to the other terminal of the capacitor via the switch element 16; in contrast, the DC voltage source 11 of the uninterruptible power supply module 7 has a negative terminal thereof connected to one terminal of the capacitor 12n and a positive terminal thereof connected to the other terminal of the capacitor 12n via the switch element 16. In other words, the uninterruptible power supply module 7 differs from the uninterruptible power supply module 1 in that, the DC voltage source 11, the switch element 16 and the capacitor 12n are connected with a different scheme but still provide the same function. Upon reviewing the above descriptions, those skilled in the art will clearly appreciate that difference in the connection scheme has no influence on accomplishment of goals of the present invention, and this will not be described herein.

According to the description above, the application of a switch element in the present invention is capable of obviating a current bounce when a power source selection switch of an uninterruptible power supply module switches between an AC terminal and a DC terminal, and continuously supplies a high-quality power supply to a load by using a control arm-bridge module to generate an output AC voltage. Furthermore, the present invention provides an optimized switch status of the power source selection switch.

As switching between the AC input terminal and the DC input terminal is actually a turnon process involving a zero current state, a current stress imposed on the power source selection switch is optimized. As a result, the service life of the power source selection switch is prolonged and reliability of the uninterruptible power supply module is enhanced. Furthermore, as the control arm-bridge module comprises a capacitor, the uninterruptible power supply module of the present invention may further maintain a constant voltage across the capacitor, thus eliminating the disadvantages of not supplying the load with adequate energy, the temporary interruption inevitably existing in the output voltage during the switch process, and causing arcing between associated contacts and consequent burnout of the power source selection switch in the conventional uninterruptible power supply modules.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An uninterruptible power supply module being coupled to an alternating-current voltage source to receive an input alternating-current voltage provided by the alternating-current voltage source, and providing an output alternating-current voltage to a load, the uninterruptible power supply module comprising:

a direct-current voltage source, being configured to provide a direct-current voltage;

a control module, being coupled to the alternating-current voltage source, and being configured to detect a voltage value of the input alternating-current and to generate a control signal in response to the voltage value;

an inductive element, being coupled to the alternating-current voltage source and the direct-current voltage source, and configured to receive one of the direct-current voltage and the input alternating-current voltage;

a control arm-bridge module, being coupled to the inductive element and the load, and configured to modulate one of the direct-current voltage and the input alternating-current voltage as the output alternating-current voltage transmitted to the load;

a power source selection switch, being coupled to the inductive element, the power source selection switch comprising an alternating-current input terminal and a direct-current input terminal, the alternating-current input terminal being coupled to the alternating-current voltage source, the direct-current input terminal being coupled to the direct-current voltage source, the power source selection switch enabling the inductive element to connect to one of the alternating-current input terminal and the direct-current input terminal in response to the control signal; and a switch element, being coupled to the direct-current voltage source and the control arm-bridge module, making the power source selection switch performing a turn-on process involving a zero current state by means of switching between the alternating-current input terminal and the direct-current input terminal so as to obviate a current bounce.

2. The uninterruptible power supply module as claimed in claim 1, wherein the switch element being turned on in response to the control signal before the power source selection switch enables the inductive element to connect to the direct-current input terminal, so that the direct-current voltage modulated by the control arm-bridge module is as the output alternating-current voltage provided to the load, and the switch element being turned off after the power source selection switch enables the inductive element to connect to the direct-current input terminal.

3. The uninterruptible power supply module as claimed in claim 1, wherein the control arm-bridge module comprises a plurality of arm-bridges connected in parallel, and the input alternating-current voltage modulated by the arm-bridges is as the output alternating-current voltage provided to the load.

4. The uninterruptible power supply module as claimed in claim 3, wherein the arm-bridges comprise a first arm-bridge, and the inductive element is coupled to the load through the first arm-bridge.

5. The uninterruptible power supply module as claimed in claim 4, wherein the control arm-bridge module further comprises a capacitor connected to the first arm-bridge in parallel, the first arm-bridge comprises a first switch unit and a second switch unit connected to the first switch unit in series, the switch element is connected to a terminal of the first arm-bridge in series, the first switch unit and the second switch unit are turned off when the second element is turned on, so that the direct-current voltage source be connected to the capacitor in parallel through the switch element, so as to provide the direct-current voltage to the capacitor.

6. The uninterruptible power supply module as claimed in claim 5, wherein the inductive element is coupled to a juncture of the first switch unit and the second switch unit so that one of the input alternating-current voltage and the direct-current voltage is as the output alternating-current voltage provided to the load through the first arm-bridge.

7. The uninterruptible power supply module as claimed in claim 1, further comprising a current limiting element, the direct-current voltage source is coupled to the switch element through the current limiting element, and the current limiting element is configured to limit the magnitude of the direct-current voltage through the switch element.

8. The uninterruptible power supply module as claimed in claim 1, wherein the switch element is an electrical switch element.

9. The uninterruptible power supply module as claimed in claim 1, wherein the power source selection switch is a mechanical switch element.

10. An uninterruptible power supply module being coupled to an alternating-current voltage source to receive an input alternating-current voltage provided by the alternating-current voltage source, and providing an output alternating-current voltage to a load, the uninterruptible power supply module comprising:

a direct-current voltage source, being configured to provide a direct-current voltage;

a control module, being coupled to the alternating-current voltage source, and being configured to detect a voltage value of the input alternating-current and to generate a control signal in response to the voltage value;

an inductive element, being coupled to the alternating-current voltage source and the direct-current voltage source, and configured to receive one of the direct-current voltage and the input alternating-current voltage;

a control arm-bridge module, being coupled to the inductive element and the load and configured to modulate one of the direct-current voltage and the input alternating-current voltage as the output alternating-current voltage transmitted to the load;

a power source selection switch, being coupled to the inductive element, the power source selection switch comprising an alternating-current input terminal and a direct-current input terminal, the alternating-current input terminal being coupled to the alternating-current voltage source, the direct-current input terminal being coupled to the direct-current voltage source, the power source selection switch enabling the inductive element to connect to one of the alternating-current input terminal and the direct-current input terminal in response to the control signal; and a switch element, being coupled to the direct-current voltage source and the control arm-bridge module, making the power source selection switch performing a turn-on process involving a zero current state by means of switching between the alternating-current input terminal and the direct-current input terminal so as to obviate a current bounce.

11. The uninterruptible power supply module as claimed in claim 10, wherein the switch element being turned on in response to the control signal before the power source selection switch enables the inductive element to connect to the alternating-current input terminal, so that the direct-current voltage modulated by the control arm-bridge module is as the output alternating-current voltage provided to the load, and the switch element is turned off after the power source selection switch enables the inductive element to connect to the alternating-current input terminal.

12. The uninterruptible power supply module as claimed in claim 11, wherein the control arm-bridge module comprises a plurality of arm-bridges connected in parallel, and the input alternating-current voltage modulated by the arm-bridges is as the output alternating-current voltage provided to the load.

13. The uninterruptible power supply module as claimed in claim 12, wherein the arm-bridges comprise a first arm-bridge, and the inductive element is coupled to the load through the first arm-bridge.

14. The uninterruptible power supply module as claimed in claim 13, wherein the control arm-bridge module further comprises a capacitor connected to the first arm-bridge in parallel, the first arm-bridge comprises a first switch unit and a second switch unit connected to the first switch unit in series, the switch element is connected to a terminal of the first arm-bridge in series, the first switch unit and the second switch unit are turned off when the second element is turned on, so that the direct-current voltage source be connected to the capacitor in parallel through the switch element, so as to provide the direct-current voltage to the capacitor.

15. The uninterruptible power supply module as claimed in claim 14, wherein the first arm-bridge further comprises a first directional element and a second directional element, the first directional element is connected to the first switch unit in parallel, the second directional element is connected to the second switch unit in parallel, so as to control the direction of the current through the first arm-bridge.

16. The uninterruptible power supply module as claimed in claim 14, further comprising a current limiting element, the direct-current voltage source is coupled to the switch element through the current limiting element, and the current limiting element is configured to limit the magnitude of the direct-current voltage through the switch element.

17. The uninterruptible power supply module as claimed in claim 10, wherein the switch element is an electrical switch element.

18. The uninterruptible power supply module as claimed in claim 10, wherein the power source selection switch is a mechanical switch element.

* * * * *